United States Patent Office 3,231,542
Patented Jan. 25, 1966

3,231,542
ORGANOSILOXANE COMPOSITIONS EMPLOYING MIXED PEROXIDE CURING CATALYSTS AND ELASTOMERS PREPARED THEREFROM
William D. Eisinger and Oliver K. Clark, Tonawanda, N.Y., assignors to Union Carbide Corporation, a corporation of New York
No Drawing. Filed Sept. 17, 1962, Ser. No. 224,240
8 Claims. (Cl. 260—46.5)

This invention relates to organopolysiloxane compositions which are heat-curable to produce elastomers which are sound, void-free and have improved surface characteristics. More particularly, the invention is directed to heat-curable organopolysiloxane compositions containing a mixture of peroxide curing catalysts and to the cured self-adherent elastomers prepared therefrom.

As used herein, the terms "self-adherent elastomers" or "self-adherent organopolysiloxane elastomers" mean organopolysiloxane elastomers having the property or ability to readily adhere to each other upon the application of slight pressure without the necessity of employing an intermediate sizing or bonding agent. Such elastomers may also be somewhat adherent to other surfaces. It has been observed that when strips of such self-adherent elastomers in the form of tapes are superimposed one upon the other with only the pressure of wrapping the tapes applied thereto, that the superimposed elastomer surfaces not only readily adhere to each other but appear to flow together and fuse upon standing. The bond therebetween thus increases in strength.

It is well known in the organosilicon art that organosiloxane elastomers can be prepared by heat-curing organosiloxane gums in the presence of a peroxide curing catalyst. It is also known that the resulting elastomers often have undesirable properties due to the characteristics of the curing catalyst employed. For example, 2,4-dichlorobenzoyl peroxide is a well known curing catalyst for organopolysiloxane elastomers. This peroxide, however, produces catalyst decomposition fragments which frequently crystallize on the elastomer surface, particularly on the surface of thick elastomer sections, forming an undesirable dusting or catalyst bloom. This bloom interferes with surface properties of the elastomer, such as self-adherence. Organosiloxane elastomers having self-adherent properties are used, for example, in the form of a tape or ribbon which can be wrapped around an electrical conductor thus providing a layer of electrical insulation. The degree of self-adhesion is important in this application since products with poor self-adhesion provide paths through which electrical current can flow, particularly under humid conditions.

Another catalyst frequently used, especially in hot air or radiant heat curing, is dicumyl peroxide. This catalyst does not form a surface bloom, but it can produce voids in the elastomer body and pin-holes and bubbles on the elastomer surface. Such voids preclude use of the elastomer in electrical insulation. Similar defects can result from the use of other peroxide curing catalysts.

These shortcomings of the prior art can be overcome and elastomers produced having improved self-adherent characteristics by use of the novel heat-curable organopolysiloxane elastomer forming compositions of the present invention which comprise (1) a diorgano-substituted polysiloxane gum, (2) a filler material, (3) a hydroxy-containing silicon compound and/or alkoxy-containing silicon compound, (4) a boron-containing compound and (5) a free radical producing organopolysiloxane curing catalyst consisting essentially of a mixture of alkyl peroxides and acyl peroxides. When the curing catalyst mixtures of the present invention are employed, the self-adherent property is maximized since the elastomer surfaces are free of voids and catalyst bloom.

The term "alkyl peroxides" refers to compounds having the structural formulas:

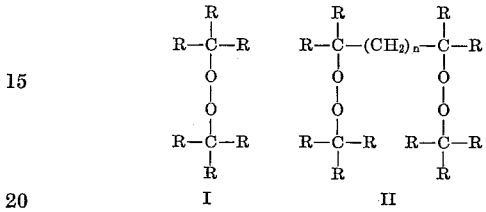

wherein R represents the same alkyl group throughout or alkyl groups of two or more different types and $n$ is zero (0) or a larger integer. Some of the R groups can be aryl groups, such as phenyl and the like. Specific examples of such "alkyl peroxides" are:

Dicumyl peroxide;
Di-tertiary-butyl peroxide;
Tertiary-butyl-triethylmethyl peroxide;
2,5-bis(tertiary-butylperoxy)-2,5-dimethylhexane;
Tertiary-butyl-tertiary-triptyl peroxide, the composition of which is represented by the structural formula:

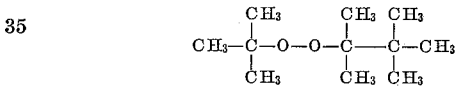

and the like. Such "alkyl peroxides" when used alone can form voids, surface pin-holes and bubbles in cured organosiloxane elastomers.

The term "acyl peroxides" refers to compounds having the structural formulas:

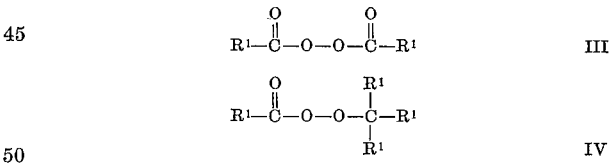

wherein $R^1$ is an alkyl group, aryl group, or halogen substituted aryl group and can be the same group throughout or two or more different types. Specific examples of such "acyl peroxides" are:

Benzoyl peroxide;
Tertiary-butyl perbenzoate;
Tertiary-butyl peracetate;
Bis-1,4-dichlorobenzoyl peroxide;
Bis-2,4-dichlorobenzoyl peroxide;
Bis-monochlorobenzoyl peroxide;
and the like.

Such "acyl peroxides" when used alone often form catalyst bloom on the surface of cured organosiloxane elastomers.

According to the present invention, a free radical producing organopolysiloxane curing catalyst mixture of 20 to 80 weight percent alkyl peroxide based on total catalyst weight and 80 to 20 weight percent acyl peroxide based on total catalyst weight is incorporated in the heat-curable elastomer-forming organosiloxane gum prior to curing the gum. The resulting cured self-adherent elastomer is sound, void-free and does not exhibit the tendency for catalyst decomposition products to crystallize on the surface.

The amount of the curing catalyst mixture employed in producing the improved siloxane elastomers of this invention can be from 0.1 to 2.5 parts by weight catalyst mixture per 100 parts by weight of the siloxane gums. It is preferred to employ from 0.5 to 1.5 parts by weight catalyst mixture per 100 parts by weight of the siloxane gums.

The curing catalysts may be employed in any of the commercially available forms including supported heterogeneous products. For optimum results where the catalyst is a solid, it is preferred to employ a finely divided catalyst, because the fine particle size promotes better catalyst dispersion within the compositions of the invention.

The polysiloxane gums employed in the heat curable organopolysiloxane compositions and elastomers of this invention are diorgano-substituted polysiloxanes containing hydrocarbon groups of one or more types. Such polysiloxanes (diorganopolysiloxane gums) can contain one or more types of substituents taken from the class of hydrogen atoms, hydrocarbon groups free of aliphatic unsaturation, olefinically-unsaturated hydrocarbon groups, halo-substituted hydrocarbon groups and cyanoalkyl groups. Preferably, the organo substituents of such polysiloxanes are composed of either (a) hydrocarbon groups of one or more types that are free of aliphatic unsaturation; (b) olefinically-unsaturated hydrocarbon groups of one or more types and hydrocarbon groups of one or more types that are free of aliphatic unsaturation; (c) halo-substituted hydrocarbon groups of one or more types and hydrocarbon groups of one or more types that are free of aliphatic unsaturation; or (d) cyanoalkyl groups of one or more types and hydrocarbon groups of one or more types that are free of aliphatic unsaturation.

Preferably, when hydrocarbon groups free of aliphatic unsaturation are present in such polysiloxanes, they are selected from the class consisting of methyl, ethyl, amyl and phenyl groups; the olefinically-unsaturated hydrocarbon groups, when present, are selected from the class consisting of vinyl, allyl and cyclohexenyl groups; the halo-substituted hydrocarbon groups, when present, are selected from the class consisting of chloro- and fluoro-substituted methyl, propyl, butyl and phenyl groups, including polychloro- and polyfluoro-substituted methyl, propyl, butyl and phenyl groups; and the cyanoalkyl groups, when present, are selected from the class consisting of beta-cyanoethyl, gamma-cyanopropyl and delta-cyanobutyl groups.

The diorgano-substituted polysiloxane gums employed in preparing the heat-curable organopolysiloxane compositions and elastomers of this invention can be employed entirely as linear diorganopolysiloxane gums, or as linear diorganopolysiloxane gums modified with lower molecular weight polysiloxane oils. The linear polysiloxane gums can be employed as relatively short chain, low molecular weight polysiloxanes of such viscosity that the gums remain pourable liquids, or they can be employed as relatively long chain, high molecular weight polysiloxanes of such viscosity that the gum approaches the solid state and will barely flow when unconfined.

These diorganopolysiloxane gums can be prepared by conventional methods, for example, by the equilibration or coequilibration of one or more cyclic or linear diorganopolysiloxanes or by the hydrolysis of one or more hydrolyzable diorganosilane monomers.

The polysiloxane gums which can be employed as one of the components of our improved polysiloxane compounds and elastomers are preferably produced under conditions so controlled as to avoid (1) the incorporation therein of any significant amounts of trifunctional compounds, groups, or molecules to avoid crosslinking of linear or cyclic polysiloxane chains through silicon and oxygen atoms and (2) the incorporation therein of any significant amounts of monofunctional compounds, groups or molecules other than those specifically provided to serve as endblockers for limiting the degree of polymerization. Accordingly, our starting polysiloxane gums contain organo-pendant groups and silicon atoms in the ratio of 2.0 organo groups per silicon atom (approximately). Deviation from a ratio of 2 in any instance, for example, ratios from about 1.96 to about 2.05, with respect to the preferred practice will be insignificant for all practical purposes since it will be attributable to the presence of endblocking groups whose total numbers will be insignificant as compared with the total numbers of organo groups attached to the silicon atoms of the polysiloxane chains.

The linear diorganopolysiloxane gums employed in preparing the elastomers of this invention can be employed either alone or as a blend of two or more different gums. By suitably selecting and blending polysiloxane gums having differing organic substituents, it is possible to achieve the effect of utilizing a single polysiloxane having two or more types of organic substituents. Blending can be effected in any suitable manner. For example, blending can be effected on or in rubber stock compounding rolls and mixers, either prior to or during the mixing and compounding of the other ingredients of the organopolysiloxane formulations employed in preparing the elastomers useful in this invention. Blending can also be effected through the use of solutions or dispersions of the ingredients to be mixed. When the linear diorgano-substituted polysiloxane gums employed in preparing the elastomers useful in this invention are modified with lower molecular weight polysiloxane oils, blending of the gums and oils can be effected in the manner described above, or in any other suitable manner.

The lower molecular weight polysiloxane oils used to modify such gums can be prepared by known hydrolysis methods. Thus, for example, dihydrocarbon-substituted polysiloxane oils can be prepared by the hydrolysis or cohydrolysis of one or more dihydrocarbon-substituted dihalo- or dialkoxysilanes in which the hydrocarbon groups attached to silicon can be the same or different.

When olefinically-unsaturated hydrocarbon groups are present in the linear polysiloxane gums employed in preparing the elastomers of this invention, they are preferably present in limited predetermined numbers, and are disposed at intervals along the linear polysiloxane chains. Thus, when such gums consist of dihydrocarbon-substituted polysiloxanes having substituents composed of olefinically-unsaturated hydrocarbon groups and hydrocarbon groups free of aliphatic unsaturation, it is preferred that from 0.037 to 0.70 percent of the silicon atoms disposed along the linear polysiloxane chains be bonded to olefinically-unsaturated hydrocarbon groups (equivalent to about 0.05 to 1.0 percent by weight of olefinically-unsaturated hydrocarbon groups). In like manner, when such gums contain organo substituents in addition to olefinically unsaturated hydrocarbon groups and hydrocarbon groups free of aliphatic unsaturation as, for example, halo-substituted hydrocarbon groups and/or cyanoalkyl groups, it is again preferred that from 0.037 to 0.70 percent of the silicon atoms present be bonded to olefinically-unsaturated hydrocarbon substituents. The introduction of such number of olefinically-unsaturated hydrocarbon groups into the polysiloxane contemplates the provision of from five to twenty crosslinks per molecule through such groups upon curing, but such groups can be present in greater or lesser amounts to provide cured elastomers of modified properties.

When the linear polysiloxane gums employed in preparing the elastomers of this invention consist of organo-substituted polysiloxanes having organo substituents composed of hydrocarbon groups and halo-substituted hydrocarbon groups, it is preferred that such gums contain an average of from about 0.1 to about 1, preferably from about 0.25 to about 0.75, halo-substituted hydrocarbon groups per silicon atom. When such gums consist of organo-substituted polysiloxanes having organo substituents composed of hydrocarbon groups and cyanoalkyl groups, it is preferred that such gums contain an average of from about 0.1 to about 1, preferably from about 0.25 to about 0.75, cyanoalkyl groups per silicon atom.

In producing the compositions and organosiloxane elastomers of the invention, any of the filler materials of the highly-reinforcing type consisting of inorganic compounds, or any suitable combination of such fillers commonly employed in the art of silicone elastomers can be employed. Such reinforcing fillers are, for example, silicas of the fumed or precipitated type, silica aerogel, carbon black, alumina and the like. It is preferred to employ finely-divided silica-base fillers of the highly-reinforcing type which are characterized by particle diameters less than 500 millimicrons and the surface areas of greater than 50 square meters per gram. The amount of such reinforcing filler employed in the compositions and elastomers of this invention can be from about 10 to 100 parts by weight per 100 parts by weight of the organopolysiloxane gum. Preferably, the reinforcing filler is employed in amounts of from about 25 to 60 parts by weight filler per 100 parts by weight of the organopolysiloxane gum.

Extending fillers can also be employed in the compositions and elastomers of this invention. Such extending fillers are those inorganic compounds of a particle diameter greater than 500 millimicrons and a surface area less than 50 square meters per gram. These extending fillers include, for example, diatomaceous earth, calcium carbonate, quartz and clay. It will be understood by those skilled in the art that the above extending fillers are merely illustrations and are not a limiting definition of extending fillers. The amount of such extending fillers employed in the compositions of this invention can be from 1 to 200 parts by weight per 100 parts by weight of the gums.

The heat-curable compositions of this invention also contain alkoxy-containing silicon compounds and/or hydroxy-containing silicon compounds. Such compounds aid in the preparation of the elastomers by prevention of crepe hardening. The alkoxy-containing silicon compounds include alkoxy-containing silicates and polysilicates, and organo-substituted alkoxy-containing silanes and polysiloxanes. Such compounds are preferably of relatively low molecular weight and contain silicon-bonded alkoxy groups in limited predetermined numbers. Such compounds contain at least one silicon-bonded alkoxy group. Preferably, the compounds are alkoxy-endblocked.

The hydroxy-containing silicon compounds employed in this invention include hydroxy-containing silicates and partially-condensed polysilicates thereof, and organo-substituted hydroxy-containing silanes and polysiloxanes. Such compounds are preferably of relatively low molecular weight and contain silicon-bonded hydroxy groups in limited predetermined numbers. Such compounds contain at least one silicon-bonded hydroxy group. Preferably, the compounds are hydroxy-endblocked.

The preferred class of alkoxy-containing and hydroxy-containing siloxanes employed in this invention consists of the dihydrocarbonpolysiloxane oils containing hydroxy or alkoxy groups. Preferably, the dihydrocarbonpolysiloxane oils are end-blocked with alkoxy or hydroxy groups. These oils end-blocked with alkoxy or hydroxy groups are more readily depicted as having the general formula:

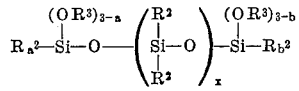

wherein $R^2$ is a member selected from the group consisting of hydrocarbon radicals, halo-substituted hydrocarbon radicals, cyanoalkyl radicals, aminoalkyl radicals and carboxyalkyl radicals; $R^3$ is a member selected from the group consisting of alkyl radicals and hydrogen; $a$ has a value of from 0 to 2; $b$ has a value of from 0 to 3; $x$ has a value of from 2 to 35; and $R^2$ as well as $R^3$ can be the same or different groups or types throughout the molecule. Preferably, $R^3$ is an alkyl group having from 1 to 6 carbon atoms. Illustrative of the alkyl groups that are represented by $R^3$ are methyl, ethyl, propyl, octyl, octadecyl and the like.

The alkoxy-containing and hydroxy-containing organo-substituted polysiloxanes which can be employed in the composition of this invention contain, as described above, at least one alkoxy group or hydroxy group to the molecule and preferably contain at least two alkoxy or hydroxy groups to the molecule. In most instances, such polysiloxanes can contain from two to six alkoxy or hydroxy groups per molecule.

Illustrative examples of such alkoxy end-blocked polysiloxane compounds are given in U.S. Patent No. 2,954,357.

The amount of the sum of alkoxy-containing silicon compounds and hydroxy-containing silicon compounds employed in the compositions of this invention can be from 0 to 100 parts by weight per 100 parts by weight of the gum. Preferably, the compounds are employed in amounts of from 4 to 80 parts by weight per 100 parts by weight of the gum.

The boron-containing compounds employed in preparing the self-adherent organopolysiloxane elastomers described above include all the known liquid and solid boron compounds which contain the elements boron, oxygen, hydrogen, carbon and nitrogen. Typical of such compounds are the boric acids, such as pyroboric acid, boric acid, and the like; the esters of the boric acids, such as trimethyl borate, triethyl borate, tri-n-propyl borate, tri-n-butyl borate, triamyl borate, tri-n-dodecyl borate, trihexylene glycol borate, tri-(2-cyclohexylcyclohexyl)-borate, tri(di-isobutylcarbinyl)borate, tristearyl borate, trioleyl borate, triphenyl borate, tri-o-cresyl borate, 2,6-di-tertiary-butyl-p-cresyl-diallyl borate, 2,6-di-tertiary-butyl-p-cresyl-di-2-ethylhexyl borate, 2,6-di-tertiary-butyl-p-cresyl-di-n-butyl borate, and the like; the anhydride of boric acid, namely, boron anhydride (boric anhydride, $B_2O_3$); the boron hydrides, such as pentaborane ($B_5H_9$), hexaborane ($B_6H_9$), decaborane ($B_{10}H_{14}$), and the like; the complexes formed by such hydrides with ammonia and other nitrogen compounds, such as triethanolamine borate, tri-isopropanolamine borate, and the complex formed between diborane and ammonia ($B_2H_6 \cdot 2NH_3$); the complexes formed by such hydrides with hydrocarbon compounds, such as diphenyldecaborane, and the like; and the alkali and alkaline metal derivatives or complexes of the boric acids, such as sodium meta-borate, potassium pentaborate, magnesium borate, and the like.

The boron-containing compounds employed in preparing such self-adherent elastomers preferably contain at least one oxygen atom in addition to at least one boron atom. Illustrative of such compounds are the boric acids, such as pyroboric acid, boric acid, and the like. The most suitable boron-containing compounds are those boron compounds which contain only boron, oxygen and hydrogen atoms, such as the boric acids, or those boron compounds which contain only boron, oxygen, hydrogen and carbon atoms.

The amount of boron-containing compound employed in preparing such self-adherent elastomers is not narrowly critical and can vary over a wide range. Generally from as little as 0.05 part by weight and less to as much as 10 parts by weight and more of boron-containing compound per 100 parts by weight of diorganopolysiloxane gum present can be advantageously employed. Preferably, such compounds are employed in amounts ranging from about 0.1 to about 4 parts by weight per 100 parts by weight of polysiloxane gum present.

Another type of heat-curable composition which results upon curing in a self-adherent organopolysiloxane elastomer contains, in addition to the components described above a titanium-containing compound. The cohesive properties of such self-adherent elastomers are improved and the bond effected between multiple surfaces of such elastomers can be strengthened by the addition of a titanium-containing compound to the organopolysiloxane formulations from which the elastomers are produced.

In addition to imparting improved characteristics to the self-adherent organopolysiloxane elastomers disclosed above, when the alkoxy-containing silicon compounds present in the organopolysiloxane formulations from which such elastomers are produced comprise diorgano-substituted alkoxy-containing polysiloxane oils, and/or the hydroxy-containing silicon compounds present in such formulations comprise diorgano-substituted hydroxy-containing polysiloxane oils, as is preferred, the use of a titanium-containing compound in such formuations usually imparts improved "green strength" properties thereto. By "green strength" of an organopolysiloxane formulation (i.e. an organopolysiloxane composition which is curable to the solid, elastomeric state) is meant the "build" and elastomeric properties of such composition which enable it to be pulled under tension without tearing. Although this property is not expressed in any unit of measure, the term is well known to those skilled in the rubber-compounding art and is evaluated by observation and comparison. The improved "green strength" imparted to such formulations by the use of titanium-containing compounds therein improves the handling properties of the formulation during subsequent processing steps.

Such above-described self-adherent elastomers incorporating titanium-containing compounds are prepared from compositions containing the diorganopolysiloxane gums, fillers, hydroxy-containing silicon compounds and/or alkoxy-containing silicon compounds, curing catalyst mixtures and boron-containing compounds described above.

The titanium-containing compounds employed in preparing the self-adherent organopolysiloxane formulations and elastomers described above are the hydrolyzable titanium-containing compounds, including, among others, titanium esters, titanium chelates and titanium salts of organic acids. In the esters and organic acid salts, the titanium atom is bonded to monodentate organic groups (that is, only one linkage connects the titanium atom to each organic moiety) while in the chelates the titanium atom is bonded to at least one multidentate organic group (that is, the organic moiety is bonded to the titanium through more than one linkage). Such compounds can be employed either individually or in any suitable combination. Illustrative examples of titanium esters which can be employed include titanium ortho esters such as tetraisopropyl titanate, tetra-n-butyl titanate, tetra-2-ethylhexyl titanate, tetrabenzyl titanate, tetrastearyl titanate and the like, mixed titanium ortho esters such as diisopropyl-di-n-buyl titanate, diisopropyl-di-2-ethylhexyl titanate, diisopropyl-distearyl titanate and the like, and the polymers of such compounds. Among the titanium chelates which can be employed may be mentioned octyleneglycol titanates such as tetraoctyleneglycol titanate, triethanolamine titanates such as tetra-triethanolamine titanate, nitrogen salts of triethanolamine titanates such as triethanolamine titanate-N-oleates and triethanolamine titanate-N-stearates, titanium lactates, and titanium acetylacetonates. Suitable organic acid titanium salts include such compounds as titanium stearates, titanium oleates, titanium acetates and the like. Mixed titanium-containing compounds, such as a mixed titanium ester and salt, for example, isopropoxy titanium stearates and isopropoxy titanium oleates, and the polymers of such compounds, and chelated titanium esters such as octyl-eneglycolbutanol titanates and triethanolaminepropanol titanates, and the polymers of such compounds, can also be employed. The titanium-containing compounds employed in preparing the improved organopolysilioxane formulations and elastomers useful in this invention can, of course, contain non-hydrolyzable groups in addition to the hydrolyzable groups present.

The preferred monomeric titanium-containing compounds employed in preparing the improved organopolysiloxane formulations and elastomers of this invention can be depicted by the formula $R_n^4Ti(OR^5)_{4-n}$, wherein $R^4$ represents a non-hydrolyzable monovalent organic group, $R^5$ represents a hydrogen atom, an $R^4$ group or an

group, and $n$ is an integer having a value of from 0 to 3 inclusive. Preferably $R^4$ and $R^5$ are organic groups containing from 1 to 18 carbon atoms and $n$ is an integer having a value of from 0 to 2 inclusive. The compounds most preferred are the titanium ortho esters, $Ti(OR^5)_4$, where $R^5$ is an alkyl group. The groups attached to titanium can, of course, be the same or different. The formula depicted above is intended to include chelated cyclic structures wherein the titanium atom can have, in addition to four primary valence bonds, two additional secondary bonds formed by the acceptance of electrons from an atom capable of donating them.

The amount of titanium-containing compound employed in preparing the improved organopolysiloxane formulations and elastomers of this invention depends to a large extent upon the results desired, upon the particular titanium-containing compound employed, and upon the kinds and amounts of other ingredients present. Since the excessive use of titanium-containing compounds will result in excessive hardening and loss of plasticity of the formulation, care must be exerted to add a proper amount of such compounds thereto. In general, from as little as 0.1 part by weight to as much as 10 parts by weight of titanium-containing compound per 100 parts by weight of the diorganopolysiloxane gum present can be advantageously employed; however, titanium-containing compounds are preferably employed in amounts ranging from about 0.5 part to about 3 parts by weight per 100 parts by weight of the polysiloxane gum present.

The heat-curable organopolysiloxane compositions of this invention are produced by admixing at a temperature below the decomposition temperature of the alkyl peroxide-acyl peroxide curing catalyst mixture the organopolysiloxane gum, filler, curing catalyst mixture, an alkoxy-containing silicon compound and/or hydroxy-containing silcion compound and boron-containing compound. A titanium-containing compound can also be included for desirable improved properties as described above.

A heat-stabilizer can also be included, if desired, in the above described compositions in order to improve their heat-aging properties. The presence of the heat-stabilizer tends to prevent rapid deterioration of the physical properties of the elastomer on being exposed to high temperatures, for example, exposure to temperatures of from 150° C. to 300° C. for from 12 to 24 hours. Examples of the heat stabilizers which can be employed in the heat-curable compositions and self-adherent elastomers of this invention include ferric oxide ($Fe_2O_3$) and metal salts of organic acids such as ferric octoate, ferric 2-ethylhexoate, finely divided cupric acetate, cupric acetate monohydrate and mixtures of of ferric octoate or ferric 2-ethylhexoate and cupric acetate or cupric acetate monohydrate.

When ferric oxide ($Fe_2O_3$) is employed as the heat stabilizer, amounts of from 1 to 2 parts by weight ferric oxide per 100 parts by weight of the gum employed. The amounts of the other heat stabilizers disclosed above are employed so as to give from about 10 to about 1000 parts iron ($Fe^{+++}$) or copper ($Cu^{++}$) by weight (calculated as the metal) per million parts by weight of the gum. Preferably the iron and/or copper is present in amounts from about 200 to about 800 parts by weight per million parts by weight gum.

Suitable mixing apparatus for preparing the heat-curable siloxane compositions include milling rolls operating at differential speeds, Banbury mixers and the like. According to the general milling technique, the organopolysiloxane gum is charged onto a roll mill, for example, and milled to give a substantially uniform sheet. The filler is then added in suitable amounts and the milling continued until the filler is uniformly dispersed throughout the organopolysiloxane gum. Other additives, such as alkoxy-containing silicon compounds and/or hydroxy-containing silicon compounds, boron-containing compounds, titanium-containing compounds, and heat stabilizers, are then added to the mixture as it is being milled to give a uniform dispersion. The alkyl peroxide-acyl peroxide curing catalyst mixture is then added and the milling continued until uniform dispersion is obtained. The mixture is milled at ambient temperatures below the decomposition temperature of the curing catalyst mixture.

The organopolysiloxane formulation so produced can then be removed from the mill and then molded or extruded and cured to an elastomer by heating to a temperature sufficiently elevated to cause the curing catalyst mixture to decompose thereby curing the organopolysiloxane composition to an elastomer. Conventional curing procedures can be employed. Thus, the polysiloxane compositions can be cured to elastomers by heating the compositions in a mold at temperatures of about 250° F. (121° C.) or higher for periods of time of fifteen minutes or longer. When polysiloxane compositions are cured by hot air vulcanizing techniques, curing is normally accomplished at temperatures of about 250° C. (482° F.) and higher for periods of about fifteen seconds and longer.

Although the cured self-adherent elastomers of the present invention are somewhat adherent to other surfaces, they can usually be easily stripped from the mold. Some sticking may occur when mold cure is carried out at temperatures of 350° F. (177° C.) or higher. However, sticking can be almost completely eliminated through the use of a conventional mold release agent, such as a dimethylpolysiloxane oil, a diethylpolysiloxane oil or a dimethylpolysiloxane oil modified with phenylmethylsiloxy units or (beta-phenylethyl) methylsiloxy units.

If desired, the mold-cured elastomer may then be subjected to postcure heat-aging. While such postcure treatments serve to stabilize the physical properties of the elastomer, they do not have a detrimental effect on the general properties of the elastomer. Postcuring can be conducted by heating at a temperature of about 350° F. (177° C.), preferably at a temperature of about 480° F. (249° C.), for a period of about twenty-four hours.

It is sometimes desirable to age a mixture of a diorganopolysiloxane gum, filler, and other additives prior to compounding such mixture with a curing catalyst mixture of alkyl peroxides and acyl peroxides and curing. Aging for a period of from about one day to one week at room temperature, or heat-aging at an elevated temperature (above about 250° F. (121° C.)) for a period of from about one to two hours or more provide opportunity for better wetting of the filler by the polysiloxane gum. In addition, precure heat-aging effectively eliminates objectionable volatile matter, such as water and absorbed gases (carried into the mixture by the filler) at a stage wherein distortion resulting from gas elimination is not harmful, and thus reduces the amount of gas that must be eliminated by postcure heat-aging at a time when density and structural form must be retained. At the conclusion of such aging treatments, a curing catalyst mixture of alkyl peroxides and acyl peroxides can be incorporated into the organopolysiloxane composition and the resulting composition heat-cured to an elastomer.

The following examples are illustrative of the novel heat curable organopolysiloxane compositions of the present invention employing curing catalyst mixture of alkyl peroxides and acyl peroxides. The terms and expressions employed in the examples and throughout this specification are to be interpreted as indicated in the Glossary immediately preceding the examples. In the examples all proportions are in parts by weight unless specifically stated otherwise.

GLOSSARY

A. *Elongation* (*ASTM D–412–51T*): Amount of stretch of a sample under a tensile force expressed as a percentage of the original length:

$$\frac{(\text{Stretched length} - \text{original length})}{\text{Original length}} \times 100$$

B. *Hardness* (*ASTM D–676–49T*): Degree of indentation produced by a plunger or indentor under a specific load. Measured with a Shore A Durometer. The values range from zero to maximum hardness of 100.

C. *Tensile strength* (*ASTM D–412–49T*): The force necessary to rupture an elastomer specimen when stretched to the breaking point divided by the original cross-sectional area (1b./sq. in.).

D. *Self-adherence* (*ASTM D–119–59T*): A strip of elastomer ribbon 24 inches long marked at 1-inch intervals, was wound in 90 seconds on a spindle during which time a 600 gram weight was fastened on the free end of the ribbon. Each layer was coincident with the previous layer, and 21 inches were thus wound, two inches being required to fasten the 600 gram weight and 1 inch being required to secure the ribbon to the winding spindle. Immediately after winding the ribbon, an additional 100 gram weight was attached to the 600 gram weight and allowed to unwind for 3 minutes. The amount unwound in inches during this intervals is called the self-adherence rating. Obviously, the lower the rating, the greater the degree of self-adherence.

*Example 1*

A composition consisting of 100 parts dimethylpolysiloxane gum containing less than 1 weight percent methylvinylsiloxane, 26 parts ethoxy end-blocked dimethylpolysiloxane, 55 parts fumed silica, 0.8 part boric acid and 0.02 part ferric 2-ethylhexoate heat stabilizer was milled on a two-roll rubber mill. This milled organopolysiloxane composition was then divided into two equal portions. To the first portion was added a paste containing 50 weight percent 2,4-dichlorobenzoyl peroxide, such paste being added in an amount of 1.5 parts per 100 parts of organopolysiloxane composition. (0.75 part 2,4-dichlorobenzoyl peroxide per 100 parts siloxane composition.) This mixture was then milled and the resulting compound labeled "Composition A." To the second portion was added recrystallized dicumyl peroxide in an amount of 0.65 part per 100 parts of organopolysiloxane composition. This mixture was then milled and the resulting compound labeled "Composition B." Two equal portions, one each from Composition A and Composition B, where then blended to yield a third compound, labeled "Composition C," which therefore contained half the concentration of each catalyst (0.375 part 2,4-dichlorobenzoyl peroxide and 0.325 part dicumyl peroxide per 100 parts organopolysiloxane composition).

Compositions A, B and C were each extruded into a ribbon form about one inch wide and 0.035–0.040 inch thick and cured by passing through a tunnel oven wherein each composition was exposed to air at a temperature of about 700° F. (371° C.) for 30 seconds. The cured samples were then cooled to room temperature, the surface of each was examined, physical properties were measured, and the degree of self-adherence was gauged. The results are listed in Table I.

TABLE I

| Properties | Samples | | |
|---|---|---|---|
| | A | B | C |
| Surface appearance | (1) | (2) | (1) |
| Tensile strength, p.s.i. | 960 | 760 | 920 |
| Elongation, percent | 560 | 700 | 680 |
| Hardness, Shore A | 53 | 52 | 53 |
| Self-adherence rating, inches | 1.1 | 1.4 | 0.2 |

[1] Good surface.
[2] Slight pin prick marks and bubbling on the surface.

It is apparent from the above data that Sample C obtained from an organopolysiloxane composition containing a mixture of 46.5 weight percent alkyl peroxide (dicumyl peroxide) and 53.5 weight percent acyl peroxide (2,4-dichlorobenoxyl peroxide) was as good as the other samples in physical strength and hardness, but had a substantially improved degree of self-adherence.

*Example 2*

Additional amounts of Compositions A and B, prepared in Example 1 above, were blended in various proportions as listed below in Table II. The separate blends were then each formed into 6 inch x 6 inch x 0.075 inch sheets. The sheets were then passed through a tunnel oven so that they were exposed to air temperature at 750° F. (399° C.) for 30 seconds. The sheets were cooled to room temperature and their surfaces examined. The results are shown in Table II.

TABLE II

| Weight Percent of Sample A Blended | Parts of Sample A Catalyst [1] | Weight Percent of Sample B Blended | Parts of Sample B Catalyst [1] | Remarks [2] |
|---|---|---|---|---|
| 0 | [3] 0 (0) | 100 | [3] 0.65 (100) | Many pin-holes or minute bubbles on the surface. |
| 10 | 0.075 (11.4) | 90 | 0.585 (88.6) | Fewer pin-holes than above. |
| 20 | 0.15 (22.4) | 80 | 0.52 (77.6) | Very few pin-hones. |
| 40 | 0.30 (43.5) | 60 | 0.39 (56.5) | Good surface. |
| 60 | 0.45 (63.4) | 40 | 0.26 (36.6) | Do. |
| 80 | 0.60 (82.2) | 20 | 0.13 (17.8) | Slight bloom evident on a good surface. |
| 100 | 0.75 (100) | 0 | 0 (0) | Great deal of bloom on a good surface. |

[1] Parts by weight of catalyst per 100 parts by weight of organopolysiloxane composition.
[2] After standing for 24 hours.
[3] Numbers in parentheses are the weight percent of individual catalyst based on total catalyst weight.

It is apparent from Table II that catalyst mixtures containing from about 20 weight percent to about 80 weight percent acyl peroxide, such as 2,4-dichlorobenzoyl peroxide, produce cured organosiloxane elastomers free of catalyst bloom on the surface. It is also apparent that catalyst mixtures containing from about 20 weight percent to about 80 weight percent alkyl peroxide, such as dicumyl peroxide, produce cured organosiloxane elastomers substantially free of surface defects. The preferred catalyst mixture contains about 40 weight percent to about 60 weight percent acyl peroxide and about 40 weight percent to about 60 weight percent alkyl peroxide. All of the above weight percent values are based on total catalyst weight.

*Example 3*

A quantity of organosiloxane composition similar to that described in Example I above was prepared and divided into two equal portions. To the first portion was added 1.5 parts by weight catalyst per 100 parts by weight of the organosiloxane composition, such catalyst consisting of a paste containing 50 weight percent 2,4-dichlorobenzoyl peroxide (0.75 part 2,4-dichlorobenzoyl peroxide per 100 parts organosiloxane composition). To the other portion was added a catalyst mixture consisting of 0.75 part by weight of the above mentioned catalyst paste per 100 parts of organosiloxane composition (0.375 part catalyst per 100 parts composition) and 0.325 part by weight dicumyl peroxide per 100 parts of organosiloxane composition. This catalyst mixture consisted of 46.5 weight percent alkyl peroxide (dicumyl peroxide) and 53.5 weight percent acyl peroxide (2,4-dichlorobenzoyl peroxide). Each portion was then extruded through a die having a cross-section of a parallelogram where one diagonal dimension was 1 5/16 inches and the other ¼ inch. Each extruded portion was cured by passing through a tunnel oven at such a rate that exposure to hot air at 700° F. (371° C.) was for a period of one minute. The cured elastomers were then stored at room temperature. Three days later, copious quantities of catalysts bloom or catalyst decomposition fragment crystals were observed on the elastomer prepared from the first portion employing 2,4-dichlorobenzoylperoxide alone as the curing catalyst. A complete absence of catalyst bloom was observed on the elastomer prepared from the second portion employing the mixture of alkyl peroxide and acyl peroxide as curing catalyst. Ninety-two days from the date of curing, the cured elastomers were again examined. The same phenomenon was observed—copious quantities of catalyst bloom on the surface of the elastomer employing acyl peroxide alone as curing catalyst and a complete absence of bloom on the other elastomer sample.

The improved heat-curable formulations of the present invention employing curing catalyst mixtures of alkyl peroxides and acyl peroxides can be used to prepare self-adherent elastomers having utility, for example, in the production of electrical insulating tapes.

What is claimed is:
1. A heat curable organopolysiloxane composition comprising (1) a diorgano-substituted polysiloxane gum wherein the substituents are selected from the class consisting of hydrocarbon groups free of aliphatic unsaturation, olefinically unsaturated hydrocarbon groups, halo-substituted hydrocarbon groups and cyanoalkyl groups and wherein the ratio of said substituents to silicon atoms is from about 1.96 to about 2.05 substituents per silicon atom, (2) a filler material, (3) at least one compound selected from the class consisting of silicon compounds containing at least one silicon-bonded alkoxy group and silicon compounds containing at least one silicon-bonded hydroxy group, (4) a boron-containing compound which contains at least one oxygen atom in addition to at least one boron atom, and (5) a free radical producing organopolysiloxane curing catalyst consisting essentially of a mixture of 20 to 80 weight percent 2,4-dichlorobenzoyl peroxide and 80 to 20 weight percent dicumyl peroxide, said weight percents based on total catalyst weight, the total quantity of said peroxides being from about 0.1 to about 2.5 parts by weight per 100 parts by weight of said diorgano-substituted polysiloxane gum.

2. A heat-curable organopolysiloxane composition as claimed in claim 1 wherein the curing catalyst consists essentially of 46.5 weight percent dicumyl peroxide and 53.5 weight percent 2,4-dichlorobenzoyl peroxide, said weight percents based on total catalyst weight.

3. A heat curable organopolysiloxane composition comprising (1) a diorgano-substituted polysiloxane gum wherein the substituents are selected from the class consisting of hydrocarbon groups free of aliphatic unsaturation, olefinically unsaturated hydrocarbon groups, halosubstituted hydrocarbon groups and cyanoalkyl groups and wherein the ratio of said substituents to silicon atoms is from about 1.96 to about 2.05 substituents per silicon atom, (2) a filler material, (3) at least one compound selected from the class consisting of silicon compounds containing at least one silicon-bonded alkoxy group and silicon compounds containing at least one silicon-bonded hydroxy group, (4) a boron-containing compound which contains at least one oxygen atom in addition to at least one boron atom, (5) a hydrolyzable titanium-containing compond, and (6) a free radical producing organopolysiloxane curing catalyst consisting essentially of a mixture of 20 to 80 weight percent 2,4-dichlorobenzoyl peroxide and 80 to 20 weight percent dicumyl peroxide, said weight percents based on total catalyst weight, the total quantity of said peroxides being from about 0.1 to about 2.5 parts by weight per 100 parts by weight of said diorgano-substituted polysiloxane gum.

4. A heat-curable organopolysiloxane composition as claimed in claim 3 wherein the curing catalyst consists essentially of 46.5 weight percent dicumyl peroxide and 53.5 weight percent 2,4-dichlorobenzoyl peroxide, said weight percents based on total catalyst weight.

5. A self-adherent elastomer comprising the heat-cured product of an organopolysiloxane composition comprising (1) a diorgano-substituted polysiloxane gum wherein the substituents are selected from the class consisting of hydrocarbon groups free of aliphatic unsaturation, olefinically unsaturated hydrocarbon groups, halosubstituted hydrocarbon groups and cyanoalkyl groups and wherein the ratio of said substituents to silicon atoms is from about 1.96 to about 2.05 substituents per silicon atom, (2) a filler material, (3) at least one compound selected from the class consisting of silicon compounds containing at least one silicon-bonded alkoxy group and silicon compounds containing at least one silicon-bonded hydroxy group, (4) a boron-containing compound which contains at least one oxygen atom in addition to at least one boron atom, and (5) a free radical producing organopolysiloxane curing catalyst consisting essentially of a mixture of 20 to 80 weight percent 2,4-dichlorobenzoyl peroxide and 80 to 20 weight percent dicumyl peroxide, said weight percents based on total catalyst weight, the total quantity of said peroxides being from about 0.1 to about 2.5 parts by weight per 100 parts by weight of said diorgano-substituted polysiloxane gum.

6. A self-adherent elastomer as claimed in claim 5 wherein the curing catalyst consists essentially of 46.5 weight percent dicumyl peroxide and 53.5 weight percent 2,4-dichlorobenzoyl peroxide, said weight percents based on total catalyst weight.

7. The self-adherent elastomer comprising the heat-cured product of the organopolysiloxane composition of claim 5, which composition includes as an additional constituent a hydrolyzable titanium-containing compound.

8. A self-adherent elastomer as claimed in claim 7 wherein the curing catalyst consists essentially of 46.5 weight percent dicumyl peroxide and 53.5 weight percent 2,4-dichlorobenzoyl peroxide, said weight percents based on total catalyst weight.

References Cited by the Examiner

UNITED STATES PATENTS

| | | | |
|---|---|---|---|
| 2,759,904 | 8/1956 | Talcott | 260—46.5 |
| 2,789,155 | 4/1957 | Marshall et al. | 260—46.5 |
| 2,902,467 | 9/1959 | Chipman | 260—46.5 |
| 2,999,078 | 9/1961 | Delphenich | 260—46.5 |
| 3,050,491 | 8/1962 | Nitzsche et al. | 260—37 |
| 3,109,826 | 11/1963 | Smith | 260—46.5 |
| 3,146,799 | 9/1964 | Fekete | 260—46.5 |

LEON J. BERCOVITZ, *Primary Examiner.*

WILLIAM H. SHORT, MURRAY TILLMAN,
*Examiners.*